United States Patent [19]
Lucas

[11] 3,766,711
[45] Oct. 23, 1973

[54] MOUTHPIECES FOR ANIMALS

[76] Inventor: Lascelles Arthur Lucas, Hertford, England

[22] Filed: May 20, 1971

[21] Appl. No.: 145,270

[30] Foreign Application Priority Data
June 6, 1970  Great Britain.................. 27,441/70

[52] U.S. Cl. .................................................. 54/8
[51] Int. Cl. .......................................... B68b 1/06
[58] Field of Search ...................................... 54/8, 7

[56] References Cited
UNITED STATES PATENTS
431,760   7/1890   Wheeler ................................ 54/8
1,278,717  9/1918  Morrey .................................. 54/7
159,527   2/1875   Stevens .................................. 54/8
169,403  11/1875   Bellinger et al. ...................... 54/8
986,044   3/1911   Burch .................................... 54/7

Primary Examiner—Hugh R. Chamblee
Attorney—Siedman & Fisher

[57] ABSTRACT

A mouthpiece for an animal, such as a horse, includes a generally flat mid-portion and lateral portions which, when the mid-portion is received between the molar teeth of the animal, project one from each side of the animal's mouth. A bridle or halter can be attached to the lateral portions to hold the mouthpiece in position. The mid-portion includes a number of beads carried on a rod which is bent to a non-rectilinear shape.

8 Claims, 2 Drawing Figures

MOUTHPIECES FOR ANIMALS

SUMMARY OF THE INVENTION

This invention relates to a mouthpiece for an animal, for example a horse or pony. The mouthpiece is advantageously fitted to the animal both when the latter is working, for example being ridden, schooled or driven, and also when the animal is not working. The mouthpiece is especially beneficial during a period of enforced inactivity, as when the animal is confined within a stable or other building.

According to one aspect of the invention there is provided a mouthpiece for an animal, such mouthpiece including a mid-portion having a generally plane form such that its width and its length are each at least twice as great as its depth, a pair of attachment means for attaching the mouthpiece to a bridle means, such attachment means lying outside a pair notional parallel lines which define the lateral extremities of the mid-portion, and two lateral portions, each connecting a respective one of the attachment means with the mid-portion.

When the mouthpiece is in use, it is fitted within the mouth of the animal in such a manner that the mid-portion lies between the upper and lower molars with the depth dimension of the mid-portion extending between the molars, and with the lateral portions projecting one from each side of the animal's mouth to the attachment means which are disposed outside the mouth.

The effect of the mouthpiece is that the animal continually chews upon the mid-portion and this flexes the jaw and promotes the flow of saliva to the mouth of the animal. Thus, the condition commonly referred to as "a fixed jaw" which involves rigidity of the jaw muscles and prevents the animal feeding, is avoided. Also the mouth of the animal is maintained in a moist condition. A further advantage which arises from use of the mouthpiece is that a horse or pony fitted with the mouthpiece is unlikely to chew the walls or fittings of a stall or loose box within which it is confined; whereas horses so confined without the use of a mouthpiece frequently chew fittings which are within reach.

For convenience, those faces of the mid-portion which are separated by the depth dimension are hereinafter referred to as being upper and lower faces.

Preferably, the upper and lower faces of the mid-portion are formed to each include a plurality of rounded surface projections which are relatively movable. Such projections encourage the animal to chew continually on the mid-portion.

It is also preferred that the mid-portion be of openwork form and include spaces which extend through the mid-portion between the upper and lower faces thereof. This construction permits free flow of saliva juices from one region of the animal's mouth to another region.

In the preferred form of the mouthpiece, the mid-portion comprises a plurality of beads carried on a rod, wire or the like which is bent to a non-rectilinear shape, but lies substantially in a plane perpendicular to the depth dimension of the mid-portion.

According to a further aspect of the invention there is provided a mouthpiece for an animal, which mouthpiece comprises a pair of attachment means for attaching the mouthpiece to bridle means, carrier means of rod-like form having a mid-portion of non-rectilinear shape such that a longitudinally extending reference axis of the mid-portion extends in different directions but lies substantially within a plane, and having two lateral portions each carrying a respective one of said attachment means, a plurality of beads carried on said mid-portion of the carrier means, and means for preventing movement of the beads from the mid-portion of the carrier means to the lateral portions thereof.

The beads may be formed of any solid material which has sufficient strength and hardness to withstand the chewing of a horse or other animal without being permanently deformed to a large extent, and without fracturing, and which does not release toxic substances. Preferably the beads are formed of metal. The action of metal beads on the teeth of a horse or other animal habitually fitted with the mouthpiece is such that the grinder teeth of the horse are maintained in a smooth condition and thus the inconvenience and expense of having the teeth filed or rasped is avoided.

BRIEF DESCRIPTION OF THE DRAWINGS

The invention will now be described by way of example with reference to the accompanying drawings wherein.

Figure 1:
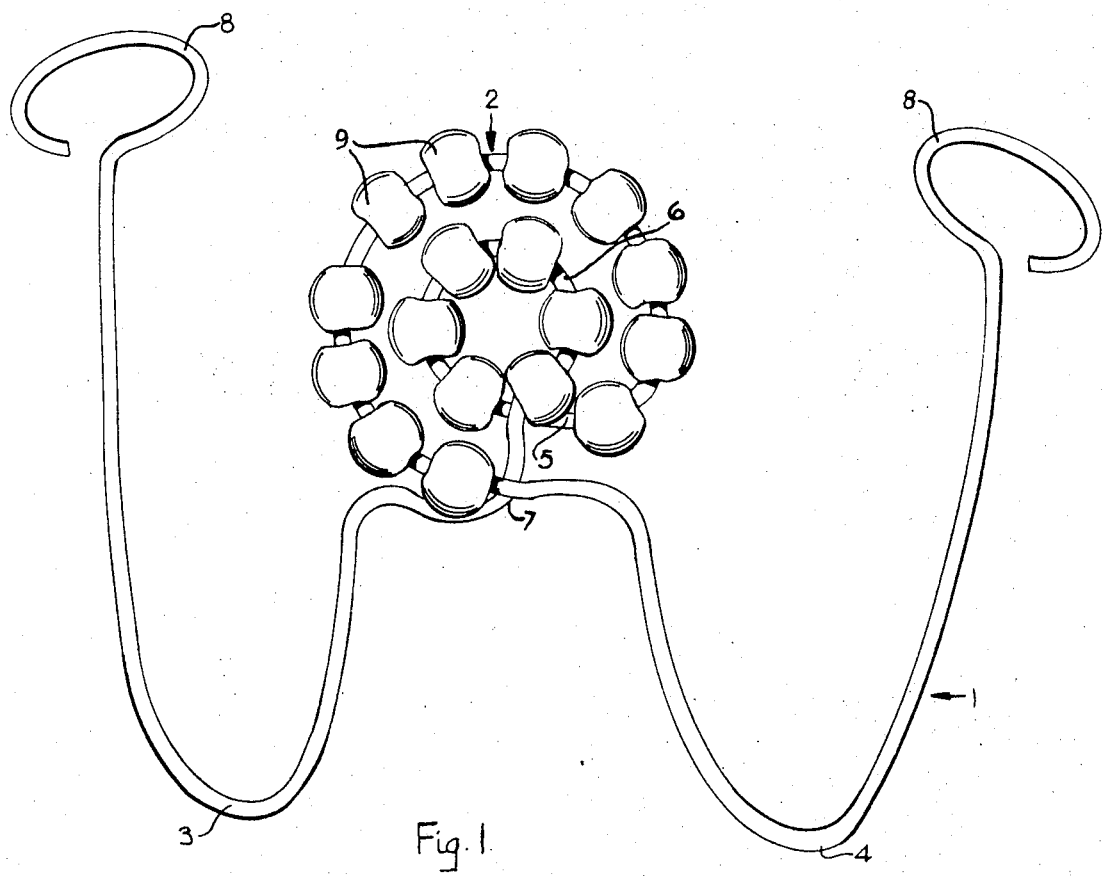
FIG. 1 is a plan view of one form of mouthpiece according to the invention.

The mouthpiece shown in FIG. 1 comprises a carrier means of rod-like form indicated generally at 1 and including a mid-portion 2 and two lateral portions, 3 and 4 respectively, which are integral with the mid-portion. The mid-portion of the rod is bent to form a spiral, the lateral portion 4 of the rod forming a continuation of the outer turn 5 thereof, and the lateral portion 3 being connected with the inner turn 6 of the spiral through the intermediary of a connecting portion 7 which crosses the lateral portion 4 and outer turn 5.

Each of the lateral portions 3 and 4 of the mouthpiece is of generally U-shape, so that the mouthpiece as a whole has the shape of a W. One limb of each of the lateral portions terminates in attachment means in the form of a ring 8 integral with the lateral portion, and by means of which the mouthpiece can be attached to a bridle or halter. The other limb of each of the lateral portions forms a continuation of the central portion.

A plurality of beads 9 are carried on each of the inner turn 6 and outer turn 5 of the mid-portion 2 of the rod. Movement of the beads along the rod from the mid-portion thereof onto the lateral portions 3 and 4 is prevented by the crossing of the connecting portion 7 and the outer turn 5 at the junction of the latter with the lateral portion 3. The beads are freely rotatable independently of one another on the mid-portion of the rod, and are distributed approximately equally on either side of the longitudinal centre line of the mid-portion.

The beads are preferably formed of metal. However, other materials, for example a ceramic or a plastics material such as nylon, which have sufficient strength and hardness to withstand the chewing action of a horse without undergoing deformation sufficient to prevent free rotation of the beads, and without fracturing, could be used.

The outer turn 5 and the inner turn 6 of the mid-portion of the rod are substantially co-planar and therefore the beads afford an upper face of the mid-portion of the mouthpiece which consists of a plurality of rounded surface projections, the uppermost extremities of which are substantially co-planar. Similarly, the lower face of the mid-portion is formed by a plurality of rounded surface projections, the lowermost extremities of which are also substantially co-planar.

Alternatively, the mid-portion may be given a slightly dished shape by displacing the inner turn 6 slightly from the plane of the outer turn 5, so that one of the upper and lower faces assumes a slightly convex form, and the other face assumes a corresponding concave form. Both the upper and lower faces would be slightly convex, if the size of the beads on the inner turn was slightly greater than the size of the beads on the outer turn. Similarly, both the upper and lower faces could be made slightly concave by using relatively smaller beads on the inner turn.

Between the beads are interstices which extend from the upper face to the lower face of the mid-portion, so that the latter has an openwork form. However, the size of these interstices is not so great that the animal is able to poke the tip of its tongue through the mid-portion.

In a mouthpiece intended to be used for a horse, the diameter of the beads may be of the order of one-half inch, so that the depth of the mid-portion 2 of the mouthpiece between the upper and lower faces thereof would be approximately one-half inch, this being the smallest dimension of the mid-portion. The width and length of the mid-portion as measured in mutually perpendicular directions which are also perpendicular to the depth dimension would each be of the order of 2½ inches. The lateral portions would typically extend 3½ inches forwardly from the mid-portion. These dimensions are given by way of example only, the preferred dimensions in any particular case depending upon the species and size of the animal for which the mouthpiece is to be provided.

The attachment rings 8 lie outside a pair of notional parallel lines which define the lateral extremities of the mid-portion, so that a clearance space exists between each lateral extremity of the mid-portion and the adjacent attachment ring. This clearance space is sufficient to ensure that when the mouthpiece is in use the attachment rings 8 do not interfere with the cheeks of the animal.

When the mouthpiece is in use, the mid-portion 2 is received between the upper and lower grinder teeth or molars within the mouth of the animal, and the lateral portions 3 and 4 extend within the mouth forwardly from the mid-portion, then laterally between the lips to the outside of the mouth, and finally rearwardly to positions alongside the mid-portion.

Preferably, the lateral portions 3 and 4 are substantially co-planar with the mid-portion 2 of the rod 1. However, the lateral portions may be inclined to the plane of the mid-portion if so required.

The strength of the rod 1 is such that the shape of the mid-portion is not substantially changed by stresses imposed when the animal chews thereon. However, the strength of the rod is preferably such that the lateral portions 3 and 4 can be bent manually to enable the shape and dimensions of the mouthpiece to be adjusted to suit the particular animal to which it is to be fitted.

It will be appreciated that the mid-portion of the rod could be bent to many shapes other than that shown in the drawing to provide a mid-portion of the mouthpiece having approximately the same overall shape. For example, the mid-portion of the rod may comprise two lobes arranged side-by-side, or two sinuous portions extending side-by-side and generally rearwardly of the mouthpiece, the sinuous portions being integrally connected at their rearward ends.

Figure 2:
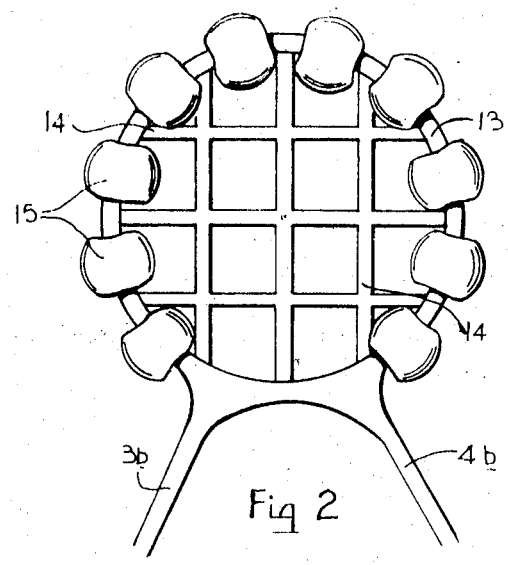
FIG. 2 is a similar view of a second form of mouthpiece.

Referring now to FIG. 2, there is shown therein the mid-portion of a further alternative form of mouthpiece according to the invention. The lateral portions of this second embodiment of the invention are similar to those described with reference to FIG. 1 and are indicated by corresponding reference numerals with the suffix *b*.

The mid-portion shown in FIG. 2 comprises a generally circular frame 13 formed of wire or rod which preferably has a circular cross-section. Cross pieces 14, also formed of wire or rod are secured between opposite parts of the frame 13 and extend across the space enclosed thereby. A plurality of beads or rollers 15 are mounted on the frame 13 between the cross-pieces 14. These beads or rollers are freely rotatable on the frame 13 and could be formed of any of the materials previously mentioned herein relative to the beads 9 shown in FIG. 1. The lateral portions 3*b* and 4*b* are secured to the frame 13 in any convenient manner, for example by welding. Alternatively the frame 13 may be formed integrally with the lateral portions 3*b* and 4*b*.

It will be noted that the upper and lower faces of the mid-portions shown in FIG. 2 are formed by a plurality of rounded projections between which are interstices extending from the upper face to the lower face of the mid-portion. Each of these mid-portions is of generally plane form, the dimensions in a plane parallel to the upper and lower faces being considerably greater than the dimensions in a direction between the upper and lower faces. The mouthpiece described with reference to FIG. 2 are positioned in the animal's mouth and used in the manner previously described relative to the mouthpiece shown in FIG. 1.

I claim:

1. A mouthpiece for an animal, such mouthpiece including:

a. a mid-portion of generally plate-like form having upper and lower faces separated by a dimension called herein the depth of the mid-portion and having a width and a length which are each at least twice as great as the depth, the mid-portion including a plurality of elements, said elements having surfaces which are exposed at the lower and upper faces of the mid-portion and are movable relative to each other, and said elements are some wholly on one side of a longitudinal centre line of the mid-portion and others wholly on an opposite side of said centre line, b. a pair of attaching means for attaching the mouthpiece to a bridle means, such attachment means lying outside a pair of notional lines which are both parallel to said centre line and which define the lateral extremities of the mid-portion, and c. two lateral portions, each connecting a respective one of the attachment means with the mid-portion.

2. A mouthpiece according to claim 1 wherein each of said lateral portions lies substantially within a plane and the upper and lower faces of the mid-portion are at least approximately equally spaced from said plane.

3. A mouthpiece according to claim 1 wherein that surface of each of said elements which is exposed is of rounded form.

4. A mouthpiece according to claim 3 wherein said mid-portion is of openwork form and includes spaces which extend through the mid-portion from its upper face to its lower face.

5. A mouthpiece according to claim 1 wherein said mid-portion comprises carrier means of rod-like form and of non-rectilinear shape, and a plurality of beads carried on said carrier means, the carrier means lying substantially in a plane which is perpendicular to the depth dimension of the mid portion.

6. A mouthpiece as claimed in claim 1 wherein the width of the mid-portion is approximately five times the depth thereof.

7. A mouthpiece according to claim 1 wherein the length of the mid-portion is approximately equal to the width thereof.

8. A mouthpiece for an animal comprising:
  a. a pair of attachment means for attaching the mouthpiece to bridle means,
  b. carrier means of rod-like form having a mid-portion of non-rectilinear shape such that a longitudinally extending reference axis of the mid-portion of the carrier means extends in different directions but lies substantially within a plane, and having two lateral portions, each lateral portion carrying a respective one of said attachment means,
  c. a plurality of beads carried on said mid-portion of the carrier means, some of the beads being disposed wholly on one side of a longitudinal centre line of the mid-portion and others of the beads being disposed wholly on an opposite side of said centre line and
  d. means for preventing movement of the beads from the mid-portion of the carrier means to the lateral portions thereof.

* * * * *